(12) United States Patent
Hausdorf et al.

(10) Patent No.: US 11,549,638 B2
(45) Date of Patent: Jan. 10, 2023

(54) SHIMBARI SYSTEMS FOR THE STABILIZATION OF SURFACES

(71) Applicant: The Metropolitan Museum of Art, New York, NY (US)

(72) Inventors: Daniel Hausdorf, New York, NY (US); Joseph Hutchins, New York, NY (US); Christina Hagelskamp, New York, NY (US)

(*) Notice: Subject to any disclaimer, the term of this patent is extended or adjusted under 35 U.S.C. 154(b) by 0 days.

(21) Appl. No.: 17/307,164

(22) Filed: May 4, 2021

(65) Prior Publication Data

US 2022/0356983 A1     Nov. 10, 2022

(51) Int. Cl.
*F16M 11/20* (2006.01)
*F16M 11/14* (2006.01)
*F16M 13/02* (2006.01)

(52) U.S. Cl.
CPC ......... *F16M 11/2078* (2013.01); *F16M 11/14* (2013.01); *F16M 13/02* (2013.01); *F16M 2200/02* (2013.01); *F16M 2200/08* (2013.01)

(58) Field of Classification Search
CPC .... F16M 11/2078; F16M 11/14; F16M 13/02; F16M 2200/02; F16M 2200/08
See application file for complete search history.

(56) References Cited

FOREIGN PATENT DOCUMENTS

CN          208512837 U   *   2/2019

OTHER PUBLICATIONS

Bainbridge, T., et al. "Short communication: Goberge, shimbari, go-bars: The use of flexible sticks for clamping." Journal of the American Institute for Conservation 54(2): 65-73 (Year: 2015).*
Jan Dorscheid, et al. "The treatment of a long case clock attributed to Jean-Pierre Latz: alternative approaches to the removal of copper corrosion products on Boulle-style marquetry", Technè, 49 | 2020, 28-33 (Year: 2020).*
Martina Trento, "The conservation treatment of the B54 Japanese Armour from the Royal Armoury inTurin", CeROArt [Online], EGG 6 | 2017, Online since May 28, 2018, URL:http://journals.openedition.org/ceroart/5272 (Year: 2018).*
Roger S William online webpage for book & paper conservation dated Feb. 1, 2021 https://www.roger-s-williams.com/ (Year: 2021).*

(Continued)

*Primary Examiner* — Terrell L McKinnon
*Assistant Examiner* — Ding Y Tan
(74) *Attorney, Agent, or Firm* — Kilpatrick Townsend & Stockton LLP

(57) ABSTRACT

Based on the traditional shimbari principle, new methods for precise positioning and support of shimbari rods utilizing a modular aluminum framing system have been developed. With these innovations, a wide range of three-dimensional works of art can be treated, including large-scale sculptures with complex contours and irregular surfaces. These methods and systems include easily adaptable shimbari clamping devices and pivot mounts developed by a team of conservators and an industrial designer-fabricator in the Department of Objects Conservation at the Metropolitan Museum of Art.

20 Claims, 14 Drawing Sheets

(56) References Cited

OTHER PUBLICATIONS

British Museum May 2, 2020 online article for museum stories for 100 years of science and conservation, https://blog.britishmuseum.org/100-years-of-science-and-conservation-recent-conservation-highlights/ (Year: 2020).*
London art school Final year conservation projects progress 2018. https://www.cityandguildsartschool.ac.uk/final-year-conservation-projects-progress/ (Year: 2018).*
Historic New England article "Inside the conservation lab: Asian lacquer treatment" dated Feb. 4, 2015.https://www.historicnewengland.org/inside-the-conservation-lab-asian-lacquer-treatment/ (Year: 2015).*
Thomas van Kampen conservation of furniture and decorated object facebook post on Aug. 14, 2018, https://www.facebook.com/thomasvkampen/posts/bainbridgeconsshimbari-no-not-shibari-this-is-a-technique-involving-the-use-fibr/432621737246945/ (Year: 2018).*
Stig Evans twitter post "holding up the sky", Jan. 14, 2020, weblink: https://twitter.com/stigevans/status/1217078019061428225 (Year: 2020).*
Roger Williams: "Tip: Shimbari at the Book Conservator's Bench" The Book and Paper Group Annual 37 (2018) 181-182 (Year: 2018).*

* cited by examiner

| Rubber | Composition (MSDS) | Barrier layer | Residue visible on low-e slide | FTIR results |
|---|---|---|---|---|
| Smooth-on Clear Flex™ Series 30 | Urethane rubber | w/o | Yes | N/A |
| Smooth-on Clear Flex™ Series 50 | | w/o | Yes | Isocyanate-based compound |
| Smooth-on Clear Flex™ Series 95 | | w/o | Yes | Polyol/ester (e.g., polypropylene glycol/ester) and other additive (possibly metal-carboxylate) |
| Smooth-on Clear Flex™ Series 30 | Urethane rubber | 0.3 mil PE film | No | N/A |
| Smooth-on Clear Flex™ Series 50 | | 0.5 mil FEP film | No | |
| Smooth-on Clear Flex™ Series 95 | | 0.5 mil Mylar® | No | |
| Silicone Inc. P-565 Platinum Clear | Polydimethyl siloxane, dimethylvinyl terminated, organo-platinum catalyst | w/o | Yes | Siloxanes |
| | | 0.3 mil PE film | Yes | N/A |
| | | 0.5 mil FEP film | Yes | |
| Silicone Inc. P-565 Platinum Clear | Polydimethyl siloxane, dimethylvinyl terminated, organo-platinum catalyst | 0.5 mil Mylar® | No | N/A |
| Canal Rubber 1/16inch FDA Clear sheet | Silicone rubber | w/o | Yes | Siloxanes |
| Canal Rubber 1/16inch FDA Clear sheet | Silicone rubber | 0.3 mil PE film | No | N/A |
| | | 0.5 mil FEP film | No | |
| | | 0.5 mil Mylar® | No | |
| Freshly made Kerr Extrude 10 XP Extra Putty | Vinyl polysiloxane (VPS) | w/o | Yes | Paraffin oil |
| | | 1 mil PTFE (Teflon) film | Yes | |
| Freshly made Zhermack SpA Elite HD+ Putty Soft | Vinyl polysiloxane (VPS) | 0.3 mil PE film | Yes | Traces of paraffin oil |
| | | 0.5 mil FEP film | Yes | Very faint traces of paraffin oil |
| | | 0.5 mil PTFE (Teflon) film | Yes | Paraffin oil |
| Freshly made Zhermack SpA Elite HD+ Putty Soft | Vinyl polysiloxane (VPS) | 0.5 mil Mylar® | No | N/A |

FIG. 5

SHIMBARI SYSTEMS FOR THE STABILIZATION OF SURFACES

FIELD

The presently disclosed subject matter relates to methods and systems for applying pressure to an object. In certain embodiments, the methods and systems may be employed for conservation of surfaces of works of art.

BACKGROUND

The Asian Art Department at the Metropolitan Museum of Art (Met) holds a significant collection of wooden polychrome sculptures and works of art decorated with Asian lacquer spanning from 300 BCE to the 21st century. The team of conservators in the Museum's Department of Objects Conservation has recently been expanded to focus on the conservation needs of this growing collection. The consolidation of delaminating and lifting decorative surfaces is a frequent component of conservation treatment. To create the clamping pressure these fragile surfaces require, the shimbari method has been most effective, but inefficient.

SUMMARY

The shimbari method has become an invaluable tool for the conservation treatment of objects with lacquered and polychrome surfaces in which controlled and defined clamping pressure from one direction only is favorable. Increased use of this technique prompted the idea for designing more efficient shimbari clamping devices suitable for the wide range of objects in a collection. This paper presents an overview of the considerations that went into the construction of three innovative shimbari frame designs.

The three clamping devices presented in this paper have been designed with adjustable backing surfaces for convenient positioning of fiberglass pressure rods to enable more efficient treatment of a wide range of objects in terms of size and materials. While initially intended for surface consolidation, the aluminum components and hardware of these clamping devices can be rigid enough to facilitate structural repairs. In addition, the frame with articulated arms can also be used for treating a flat element such as a wall panel or a mural painting.

Flexible, transparent pressure pads (made efficiently in a custom mold) combined with barrier layers tested safe for works of art can provide a suitable alternative to pads of multiple layers. The concept and components of the frames can be scaled or modified to suit the needs of other conservation studios. The moderate cost of building these versatile clamping devices is well justified in view of the time saved by not having to repeatedly fabricate single-use supports.

The shimbari principle can also be applicable to furniture, folding screens, and wall paneling. These may require the construction of large-scale frames or wooden brackets clamped to a worktable. For large-scale objects or objects that cannot be moved, scaffolds with boards or simply a wall can be used as a counter surface for the shimbari rods.

BRIEF DESCRIPTION OF THE DRAWINGS

FIG. 5 is a chart of samples tested with and without barrier layers.

DETAILED DESCRIPTION

The presently disclosed subject matter now will be described more fully hereinafter with reference to the accompanying description and drawings, in which some, but not all embodiments of the presently disclosed subject matter are shown. The presently disclosed subject matter can be embodied in many different forms and should not be construed as limited to the embodiments set forth herein.

Based on the traditional shimbari principle, new methods for precise positioning and support of shimbari rods utilizing a modular aluminum framing system have been developed. With these innovations, a wide range of three-dimensional works of art can be treated, including large-scale sculptures with complex contours and irregular surfaces. Various silicone and non-silicone rubber materials, including a number of barrier layers, were tested for their suitability as pressure pads. These methods and systems include easily adaptable shimbari clamping devices.

Figure 1:
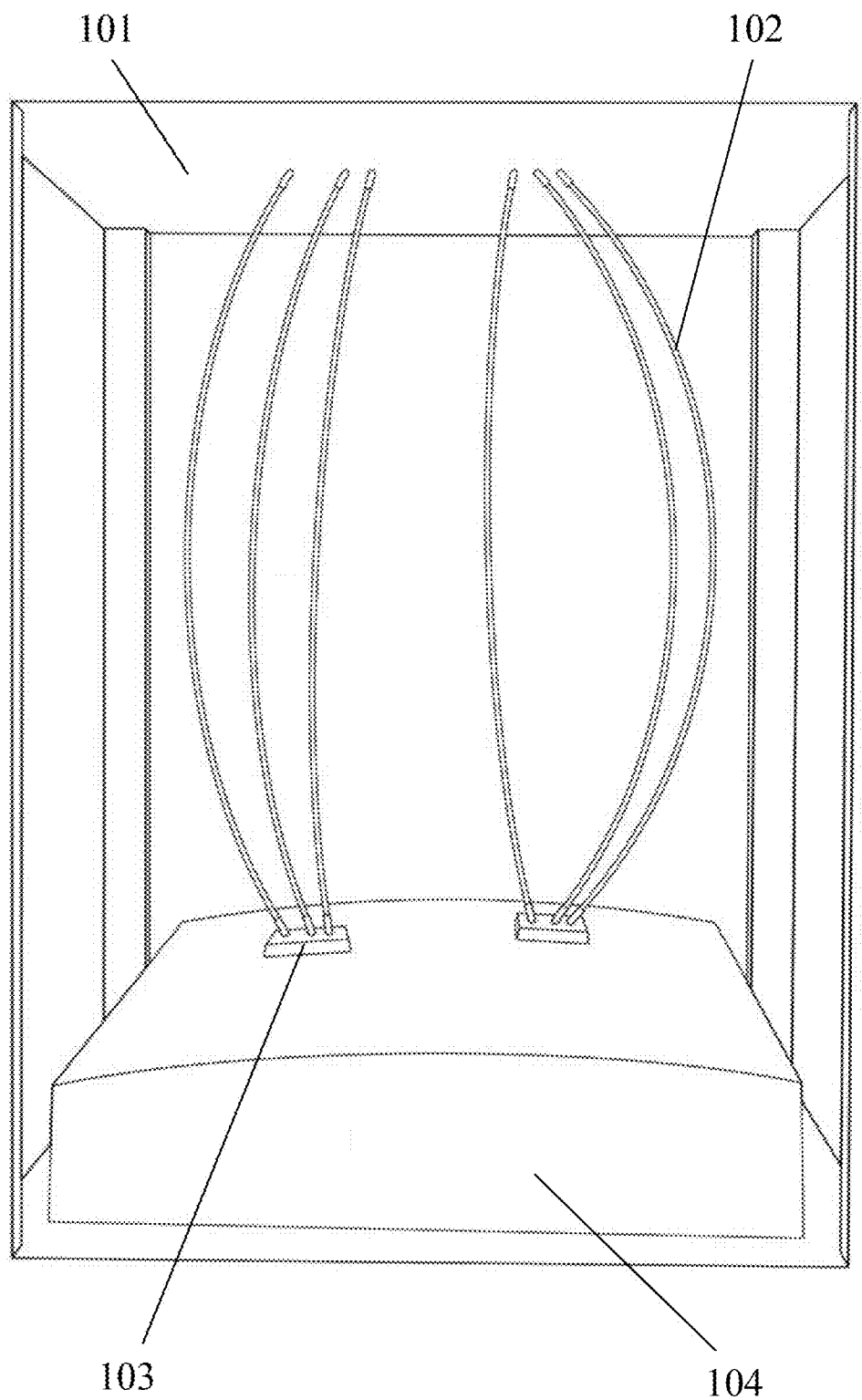
FIG. 1 is a drawing of conventional shimbari technique.

Shimbari is a Japanese term for the practice of using an externally braced rod or post to apply controlled pressure to an object for assembly or repairs. It includes rods that provide pressure, a suitable backing surface to brace the pressure rods against (which can range from the interior of a small box to a wall or ceiling), and, when appropriate, a protective element (pressure pad or block) between the pressure rods and the object to distribute the force as desired. The same principle underlies goberge poles used by cabinetmakers for centuries and the "go-bar" clamping system popular with string instrument makers today. The principle has the advantage of providing pressure from one direction only, unlike conventional clamps. FIG. 1 shows the basic principle of shimbari, highlighting the three basic elements: frame with backing surface 101, pressure rods 102, and pressure pads 103, in relation to object 104.

As stated in Bainbridge et al. (2015), the Japanese shimbari method "was first used in the context of lacquer conservation by Yoshikuni Taguchi (1923-1998), a living national treasure for his skills as a maki-e artist and traditional restorer of Japanese lacquer (urushi). According to his son, Yoshiaki, the elder Taguchi began using apple crates and bamboo splints for shimbari clamping during the 1960s." Since then, this simple but effective method for applying pressure has been used in Japan for stabilizing lacquered surfaces and has received increasing attention in the wider conservation community.

Shimbari frame designs can vary in size and shape according to the objects to be treated. For smaller objects, the most common constructions (derived from Taguchi's apple crates) are open frames to hold removable slats or panels acting as backing surfaces. For stability of the braced rods, the face of these backing surfaces can be often thinly grooved or covered with a gritted material. Shaped backing surfaces made from wood, dense polyethylene foam, and other materials can be added for objects with more complex contours.

The shimbari principle can be also applicable to furniture, folding screens, and wall paneling. These require the construction of large-scale frames or wooden brackets clamped to a worktable. For large-scale objects or objects that cannot be moved, scaffolds with boards or simply a wall can be used as a counter surface for the shimbari rods.

Shimbari Pressure Rods

Any material that produces the desired counterforce when bent may work. Bamboo and wooden dowels have traditionally been used. They are readily available and easily cut to size as needed. An innovative system, built initially for the treatment of large-size Chinese lacquer panels at the Preservation Society of Newport County, in Newport, R.I., USA, incorporated reversed quick-grip bar clamps retrofitted with wooden sticks and compression springs. In recent years, solid fiberglass pressure rods of different diameters have also been used for shimbari. Unlike wood or bamboo, which lose resilience after repeated use, fiberglass pressure rods are more flexible, retain their resilience, and can exert consistent pressure over an extended period of time. Clamping tests with fiberglass rods of different length and thickness can exert consistent pressure, even after multiple days. Rods can be reusable and durable. Fiberglass pressure rods can be obtained from kite-making suppliers and require some preparation before use. Cutting them to the appropriate length may be best achieved with cable cutting pliers to prevent the fiberglass ends from fraying. This should be done wearing protective gear as this material has the potential to irritate the eyes, skin, and upper respiratory tract. Coating the bare fiberglass pressure rods with a diluted polyvinyl acetate (PVA) adhesive can make them safe for handling (Bainbridge et al. 2015). Rounded polyvinyl end caps can provide added friction to grip the pressure pads while protecting the cut ends of the rods.

A bent shimbari rod is literally a spring and, in some situations, can have the same tendency to jump away if not positioned properly. A symmetrical orientation of the compressed rod between the backing surface and object surface may result in maximum stability. This can be achieved when the backing surface and object surface are approximately parallel. With practice, appropriate positioning, even on complex shapes, can become intuitive. Additional stability can be provided by a textured or dimpled face on the backing surface and, when possible, on the top face of the pressure pad. When a low friction barrier layer such as Mylar is used to isolate the repairs from the pressure pad, more careful alignment of the rod may be appropriate.

Figure 2:
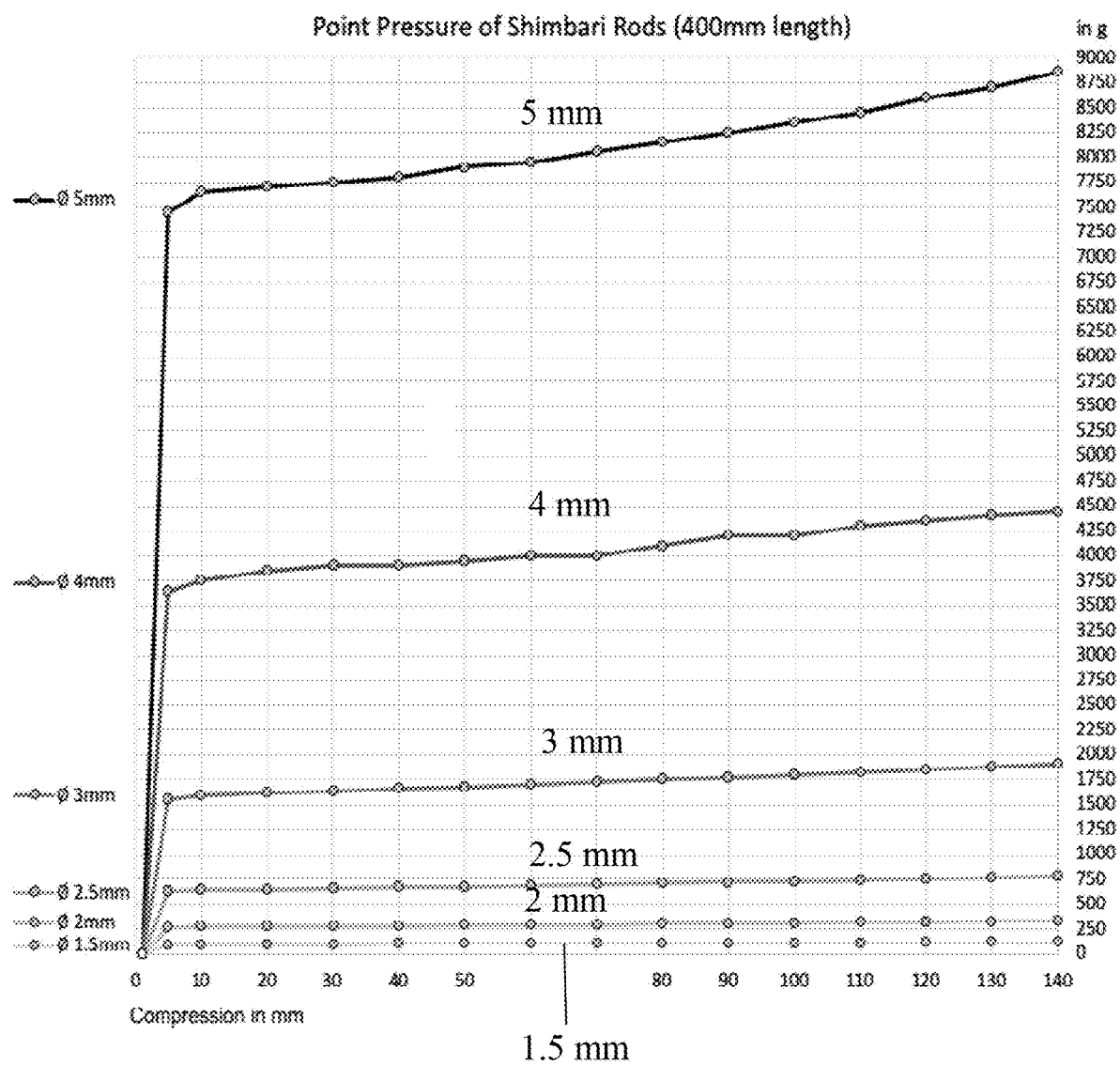
FIG. 2 is a chart showing the point pressure achieved with a 400 mm fiberglass rod at different diameters measured between 10 and 140 mm of compression.
Figure 3:
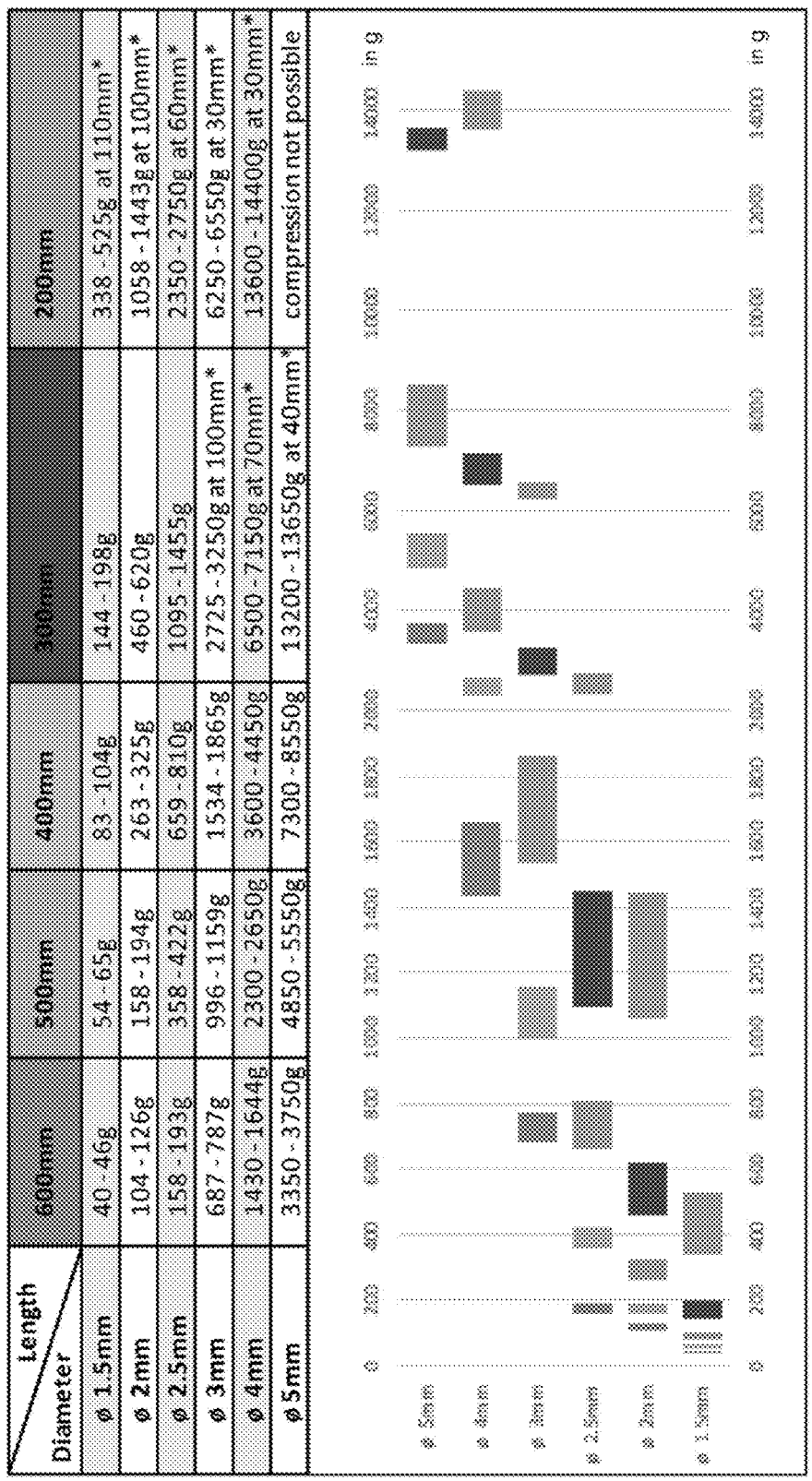
FIG. 3 is a chart of ranges of point pressure for various fiberglass diameter at different lengths measured between 10 and 140 mm of compression.

To determine the amount of point pressure that can be achieved with fiberglass pressure rods of different length and thickness, rod pressure testing was conducted. As shown in FIG. 2, six different diameters (1.5, 2, 2.5, 3, 4, and 5 mm) each at five different lengths (600, 500, 400, 300, and 200 mm) were selected and vertically compressed using a drill press quill and a digital scale. The pressure rods were compressed in 10 mm steps, from 0 to 140 mm, and the exerted point pressure noted for each. Some of the shorter rod combinations could not be compressed to the same extent, either because their length would not allow for a compression of 140 mm or their length/thickness ratio required excessive force that is not feasible in an actual clamping scenario. Given that the rod manufacturing process creates homogeneous, parallel, fiberglass structures, it was not surprising to see that the point pressure of each successive rod diameter increased at a similar rate. The ranges of exerted point pressure are visualized in FIG. 3, showing the ranges of point pressure (g) for various fiberglass diameters at different lengths measured between 10 and 140 mm of compression. For better presentation, the increments between 0 and 2,000 g are in 200 g, while the increments between 2,000 and 15,000 g are in 2,000 g. Combinations marked with an asterisk (*) were rod combinations that could not be compressed to full extent because its length would not allow for a compression of 140 mm or its length/thickness ratio required excessive force imposing risk of breaking.

The test results can serve as a useful guide when deciding which diameter of fiberglass rod to use to achieve the appropriate pressure required for a treatment. For example, multiple pressure rods of a smaller diameter or longer length might be substituted for a smaller number of thicker or shorter pressure rods to achieve a different distribution of the same pressure. Using longer pressure rods can have the considerable advantage that the conservator has more space to work around the object.

It is somewhat counterintuitive, but the tests have shown that the pressure exerted by a fiberglass rod is determined primarily by its diameter and length, not the degree to which it is bent between two surfaces. For instance, after the initial bending of a 3 mm diameter rod that is 400 mm long to fit in a 390 mm space, the additional force available by bending the rod into a 260 mm space (a factor of 14) increases the force applied by an average factor of only 1.2 (FIG. 2). This characteristic typically eliminates the need to trim individual pressure rods precisely to length and facilitates treatment of three-dimensional shapes with flat backing surfaces because the pressure rods will provide approximately the intended force whether bent to a moderate or greater degree.

Pressure Pads

In order to evenly distribute the point load of the pressure rods onto a defined area, a protective element in the form of a rigid or flexible pressure pad (depending on the nature of the object's surface) may be necessary. A typical pad consists of three components: (1) a rigid backing such as sheet acrylic, wood, or plywood to distribute pressure; (2) a flexible material such as polyvinyl chloride sheet, synthetic rubber, neoprene, or polyethylene foam; and (3) a barrier layer of thin polyester (Mylar) or polyethylene film to prevent the pressure pad from adhering to the object and the residues of padding materials from contaminating the work of art.

While these pads are most suitable for nominally planar surfaces, the team looked into producing pads that conform to the varied contours of a three dimensional surface since it is a crucial element for achieving satisfying results. When possible, such pads should be made of a transparent material allowing visual access during consolidation.

Even pressure distribution of a pad can depend on its hardness and its ability to conform to the contours of a surface. The hardness of polymers, elastomers, and rubbers can be compared using the Shore hardness scales that provide a common reference point. Hardness may be measured using a durometer gauge, in which a spring-loaded steel rod compresses the surface of the sample to provide a reading. A reading of 0 Shore describes the maximum possible indentation of the rod into the sample, and 100 Shore indicates almost no indentation at all or very high resistance to indentation. There may be different overlapping Shore hardness scales for measuring the hardness of different materials. For example, the Shore 00 scale measures extremely soft materials like gels. The Shore A scale measures a wide range of material types from very soft and flexible to semi-rigid plastics with almost no flexibility at all. The Shore D scale measures very hard rubbers, semi-rigid, and rigid plastics.

Many rubber materials, especially silicones, may leave residues that can result in staining of a surface or changing its chemistry (hydrophobicity). Studies that looked into the staining produced by silicone-based polymers used in conservation demonstrated that silicone rubber materials may leave residues on porous materials, making them unsuitable for these applications. Silicone oils (siloxanes) can drastically change the chemical properties of a surface, making it hydrophobic. The residue may be reduced, but it is unlikely to be effectively removed even with a nonpolar solvent from porous, absorbent substrates.

Four different silicone rubbers and one urethane-based rubber with three varying Shore hardness values that have been found favorable for their properties were tested. In addition, four types of barrier layers, both stretchable and non-stretchable, were tested in combination with the various rubbers. The samples were clamped onto low-e microscope slides (infrared light reflecting glass microscope slides, shown in FIG. 4) for 48 hours. The residues left on the slides were then documented and analyzed with infrared microspectroscopy (micro-FTIR). Residues accumulated on low-e microscope slides (MirrIR by Kevley Technologies) after application of the rubber were detected on the greenish-reflective, smooth surface of these slides and analyzed by Fourier transform infrared microspectroscopy (micro-FTIR) in reflection mode. A Hyperion 3000 microscope interfaced to a Tensor 27 spectrometer (Bruker Optics), equipped with a 15×FTIR objective and a liquid nitrogen-cooled MCT detector (mercury-cadmium-telluride) was used. The FTIR spectra were acquired as a sum of up to 128 scans in the range of 4000 to 550 cm' and at 4 cm' resolution. FTIR spectra interpretation was based on comparison with reference material and data from literature.

Figure 4:
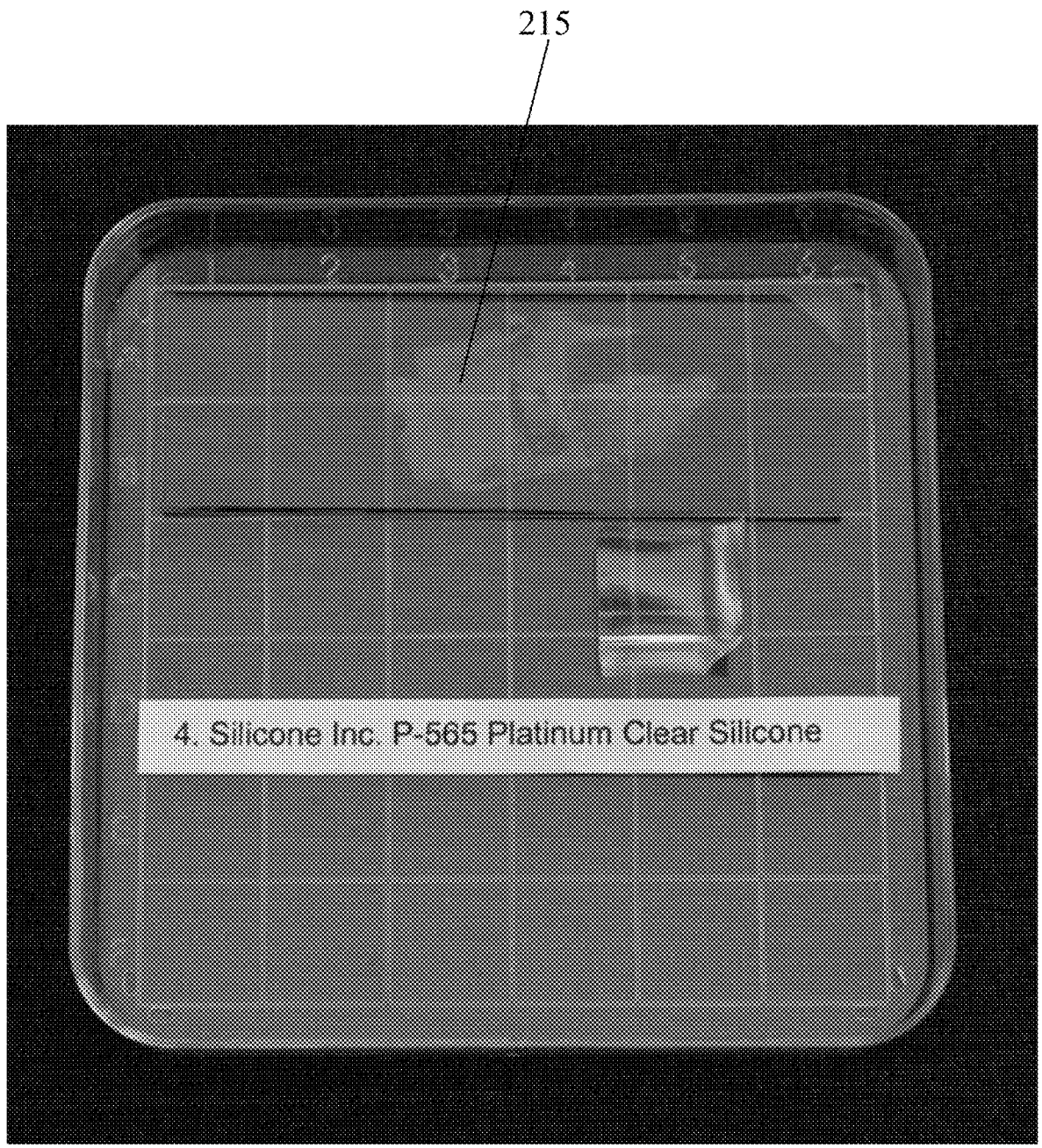
FIG. 4 is a photograph showing purple residues of a rubber accumulated on the greenish-reflective, smooth surface of a low-e microscope slide.

FIG. 4 shows a purple residue 215 from rubber that accumulated on the greenish-reflective, smooth surface of a low-e microscope slide. Due to the extended closure of the museum as a result of the Covid-19 pandemic, it was impossible to conduct FTIR analysis on all samples. However, the preliminary results show that all of the silicone rubbers left significant amounts of residues such as paraffin and silicone oils (siloxanes), even in combination with three of the four barrier layers. Only the non-stretchable Mylar completely isolated the low-e microscope slide. The urethane rubbers left residues as well, but when tested in combination with the barrier layers, no residues were detected. While these samples were not analyzed with FTIR, tests have shown that no residue is detectable with FTIR when no residue is visible on the low-e microscope slide. For stretchable barrier layers, polyethylene film and fluorinated ethylene propylene (FEP) film showed the best isolating properties. FIG. 5 shows the tested materials and the preliminary results on the nature of the residues. Further complementary analysis by separation techniques (e.g., gas chromatography-mass spectrometry) may be necessary to identify their exact composition.

The test results indicate that the urethane-based rubbers in combination with barrier layers of FEP, polyethylene, and Mylar may be an excellent choice for pressure pads that need to be flexible in order to accommodate three dimensional surfaces with contours. Mylar has proven to be the best barrier layer, but its non-stretchable nature may be less ideal for non-flat surfaces. These results led to the creation of a pressure pad kit containing different sized pads made of clear urethane rubbers ranging from 30, 50, and 95 Shore A. Dimples incorporated directly on the top face of the pressure pads prevent the fiberglass pressure rods from jumping off.

Figure 6:
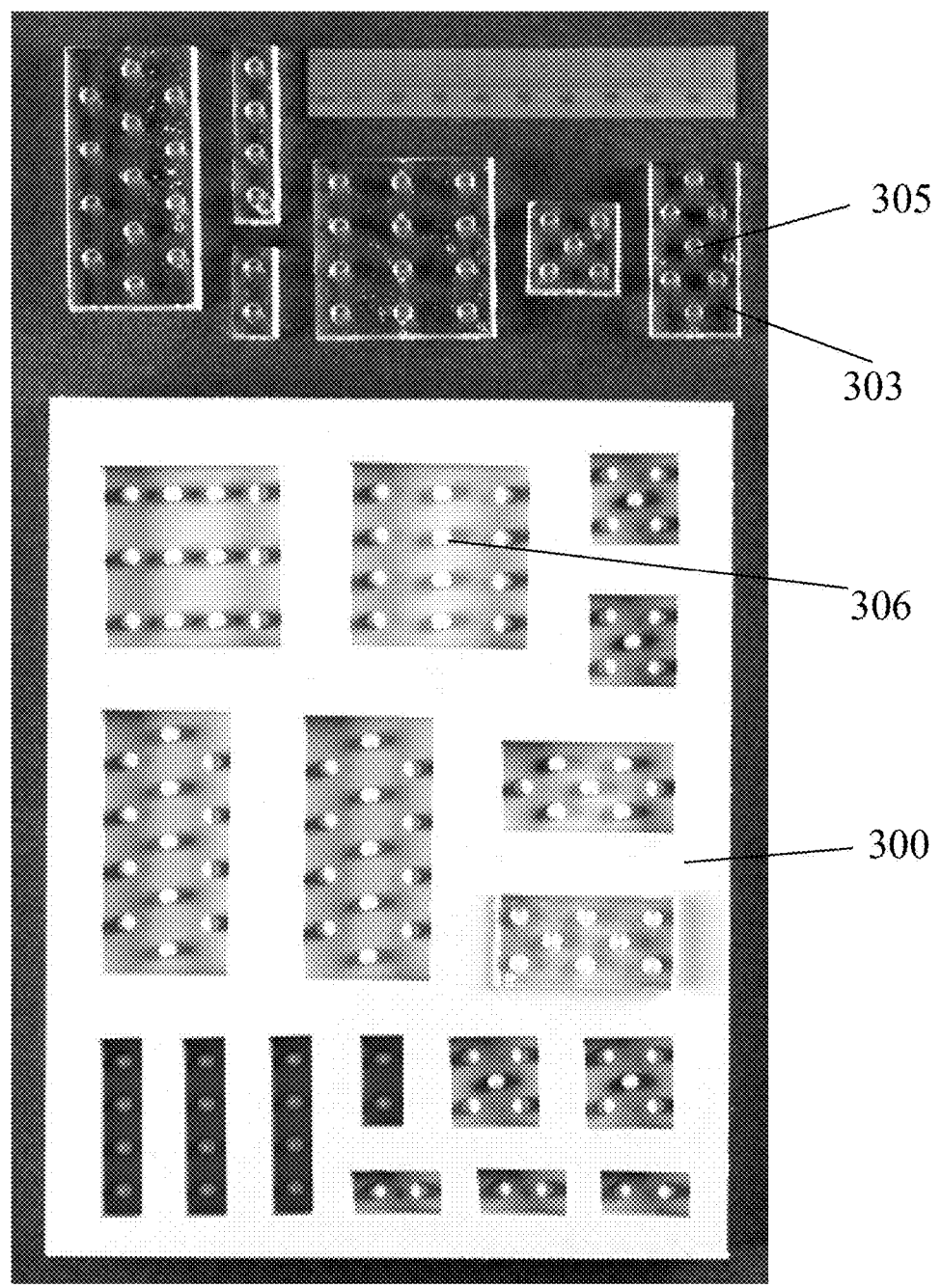
FIG. 6 is a photograph of a custom silicone mold for polyurethane pressure pads with dimples.

As shown in FIG. 6, molds were made to prepare pressure pads. The molds were initially cast using thin Lego blocks and a base plate as molds to produce ample dimples. The team also made a flexible, custom mold 300 in order to control the density and arrangement of the dimple array 306 to produce dimples 305 and facilitate easier casting of the pad 303.

Frames and Backing Surfaces

The need for a more versatile shimbari system to treat the majority of Asian lacquer objects and wooden polychrome sculptures led to the design of three clamping devices. The process was guided by the experience gained with earlier makeshift shimbari constructions. After evaluation of various commercial options, the decision was made to use a modular building system produced by the company ITEM (Industrietechnik GmbH). This system includes high strength extruded aluminum components with structural T-nut longitudinal slots facilitating the attachment of additional parts and hardware. The components may be made in a range of sizes and weights and can be combined in many variations. The selection of components can be based on factors of strength, rigidity, weight, and resistance to moment forces.

Standard Cubes

Cubic shimbari frames with inserted sliding slats can be extremely useful in conservation practice. Two light and rigid frames of 460×380×380 mm and 500×570×710 mm (outside dimensions) were constructed of 30×30 mm components. The dimensions accommodate the majority of the small and medium-sized objects in the collection while also fitting safely on the workbenches of the conservation lab. They can be nested for compact storage. It should be recognized that frames of other sizes and shapes may be constructed for shimbari methods. For example, the frames may be larger or smaller than the examples described herein.

Depending on the form and size of the work of art, these frames can be positioned vertically or horizontally; the designated bottom can be fitted with a plywood board to hold the object. T-nut slots on the inner faces allow for the insertion and positioning according to need of friction-fitted slats that can serve as backing surfaces. In some examples, the T-nut slots may be 6 mm wide and 10 mm deep; however, it should recognized that any slot dimension that allows for secure positioning and movement along the frame may be used.

To compensate for pressure exerted when the pressure rods are placed, the slats can require a certain rigidity. The wider the frame and hence longer the slats, the more rigidity may be required. For a smaller cube, 35 mm wide and 6 mm thick ash wood slats can provide sufficient stiffness, while thicker and wider slats may be needed for a larger cube. The sides of the slats facing towards the object may be finely grooved to secure the positioned shimbari rods.

Figure 7A:
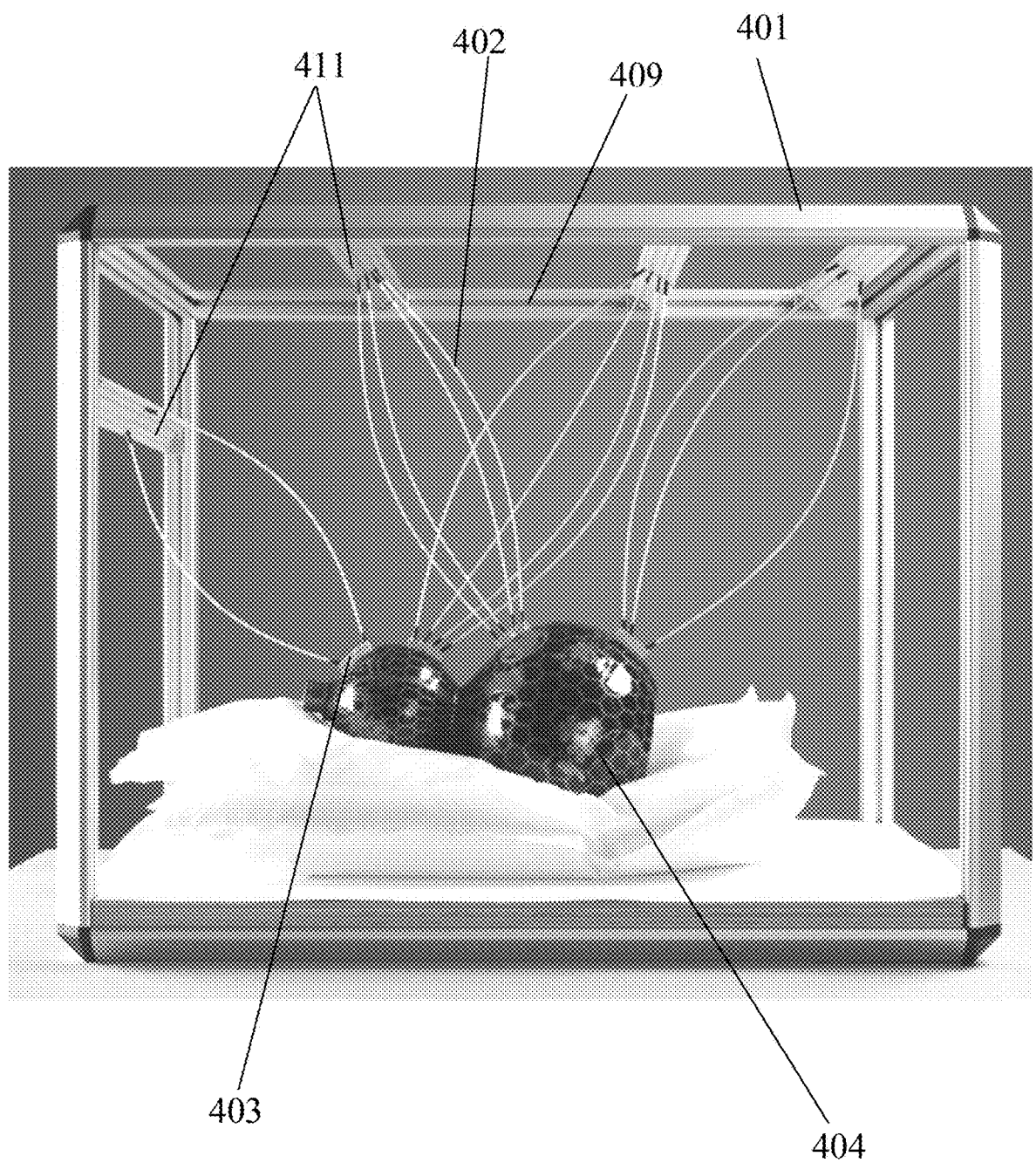
FIG. 7A is a photograph of a shimbari cube with grooved slats on pivot mounts.
Figure 7B:
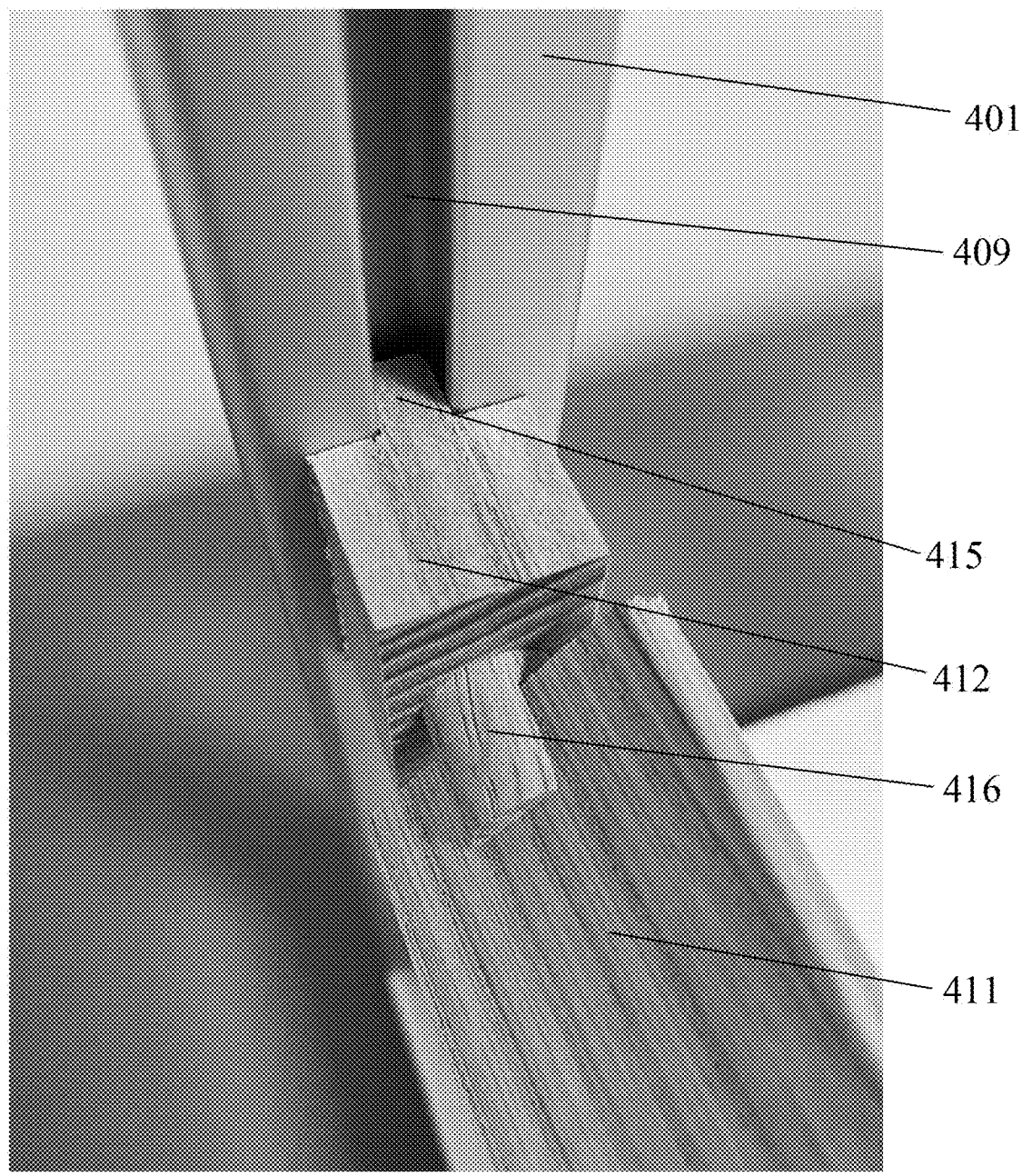
FIG. 7B is a photograph of a pivot mount with a grooved slat positioned in a frame.

As noted above, for greater stability the backing surface should be aligned with the object's surface. FIG. 7A shows a shimbari cube frame 401 with a T-nut slot 409 on the inner face of the frame 401, with finely grooved slats 411 attached to pivot mounts 412 (not shown), allowing for parallel alignment and secure positioning of the pressure rods 402 and urethane-based pressure pads 403 with barrier layer of FEP film on the surface of an object (e.g., lacquer sake bottle) 404. To achieve a parallel arrangement between the backing surface, slat 411, and the object's surface 404, a simple pivot mount 412 can hold the slat 411 in the frame and may allow the slat 411 to rotate and align parallel with the object's surface, as shown in FIG. 7B. The pivot mounts 412 may include blocks with a tenon 415 on one side to slide in the slots 409 of the frame 401 and a hole to receive a friction-fitted dowel 416 on the opposite side. The dowels, in turn, may have a slot to hold the slats 411. In some cases, the slat and/or the pivot mount may be wooden. In some cases, the slat and/or the pivot mount may be polymeric or other suitable material known to those skilled in the art. To securely position objects having an irregular shape before applying the pressure rods, vacuum cushions filled with polystyrene spheres can be used.

Frames on a Tracking System

Figure 8:
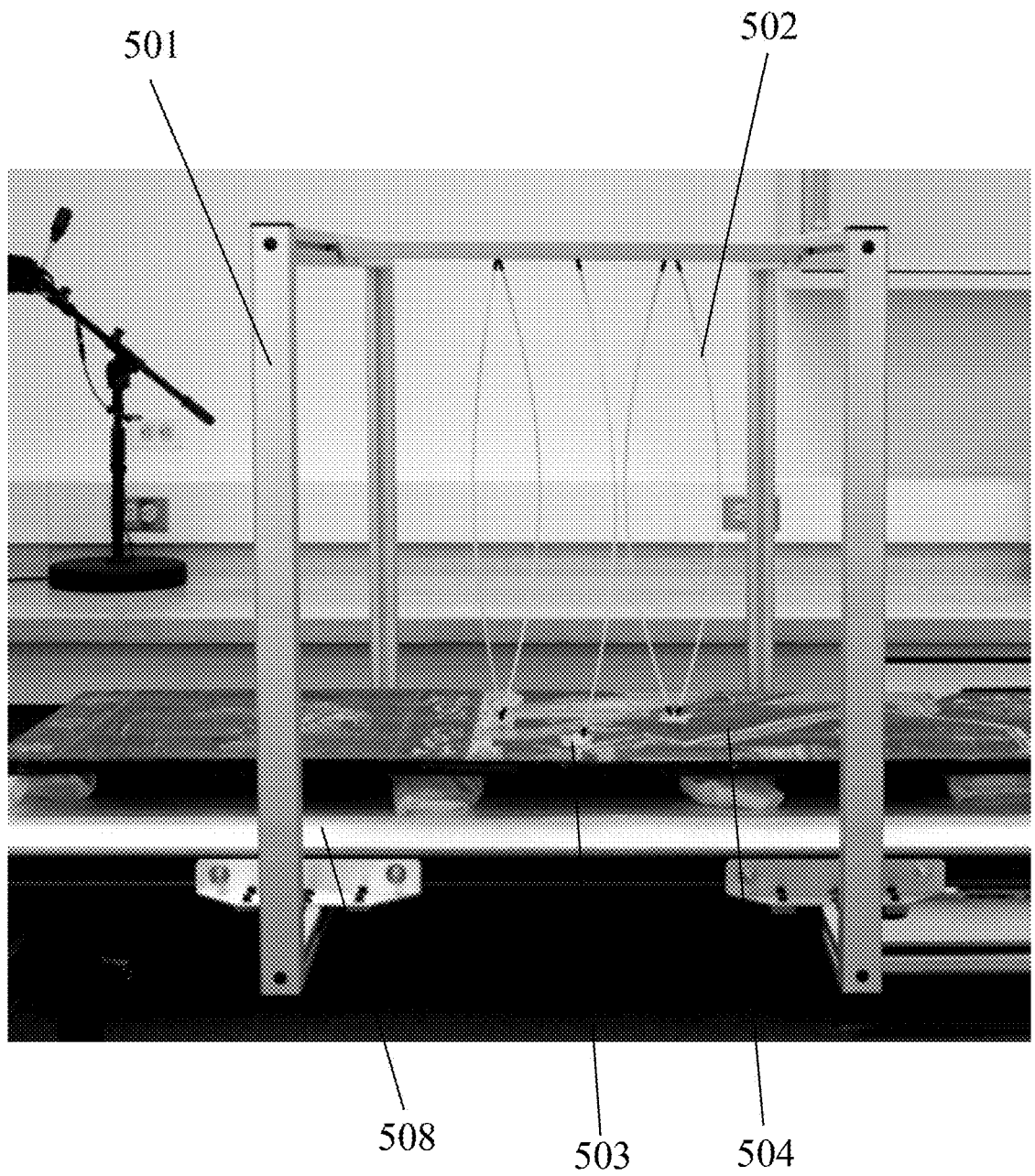
FIG. 8 is a photograph of moveable and locking shimbari frames attached with aluminum angles and ball bearing wheels on steel track rail.

Larger objects require frames that are often oversized and heavy, which take up much storage space and are not always easy to reuse. Wooden brackets clamped to a worktable may be difficult and impractical to move or reposition by a single person. This led to the design of a movable and locking shimbari system shown in FIG. 8 using the ITEM components on an industrial rail and captured wheel system. A pair of rectangular frames measuring 1305 mm×760 mm (outside dimensions) was made of 40×40 mm components with 8 mm wide and 15 mm deep T-nut slots. It should be recognized that frames of other sizes may be constructed for shimbari methods. For example, the frames may be larger or smaller than the examples described herein. The frames 501 were attached with aluminum angles and ball bearing wheels on steel track rail attached to a table 508.

The C-shaped steel rails can be installed on the long sides of the tabletop. Ball bearing wheels mounted on short brackets of 90-degree aluminum angle can support the frames perpendicular to the table and provide for movement. Locking thumb screws may secure the frames where desired. The pressure rods 502 may apply pressure to the object 504 using pressure pads 503. The cost of hardware for this system may be modest, it may be safer for the objects, and one person can quickly reposition the frames.

Frame with Articulated Arms

Figure 9:
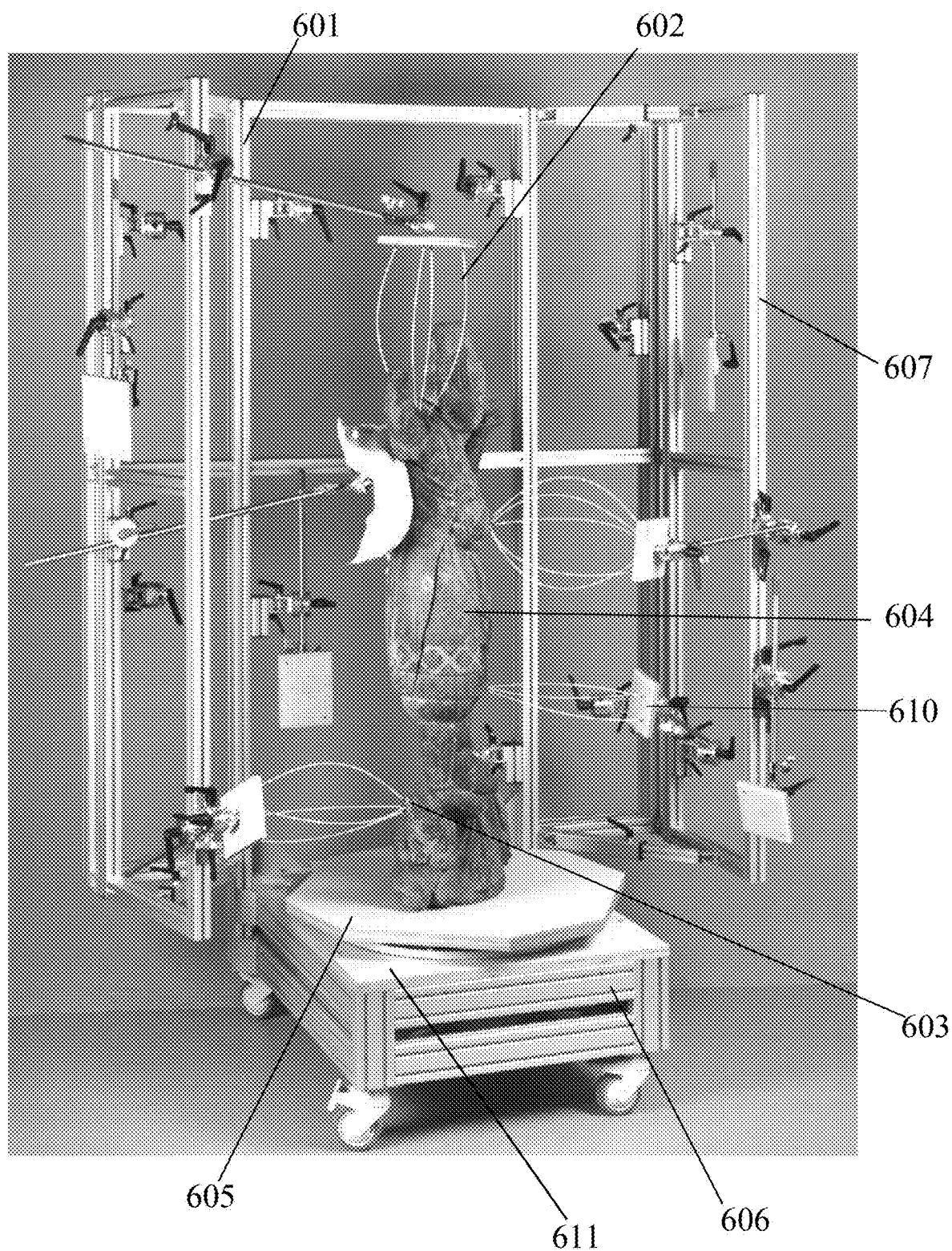
FIG. 9 is a photograph of a large clamping device with multiple backing surfaces in various locations.
Figure 10:
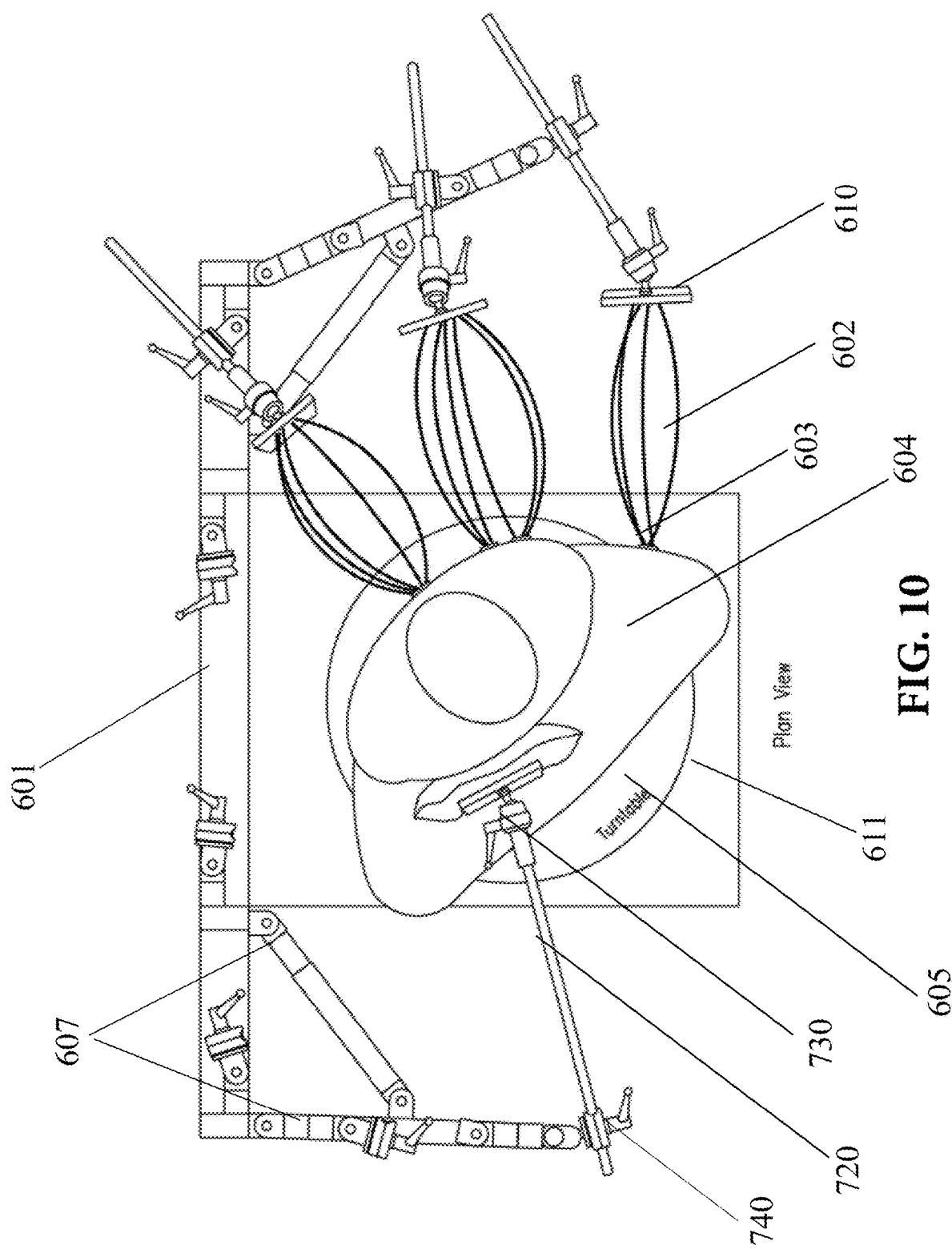
FIG. 10 is a conceptual drawing of a large clamping device with backing plates.
Figure 11:
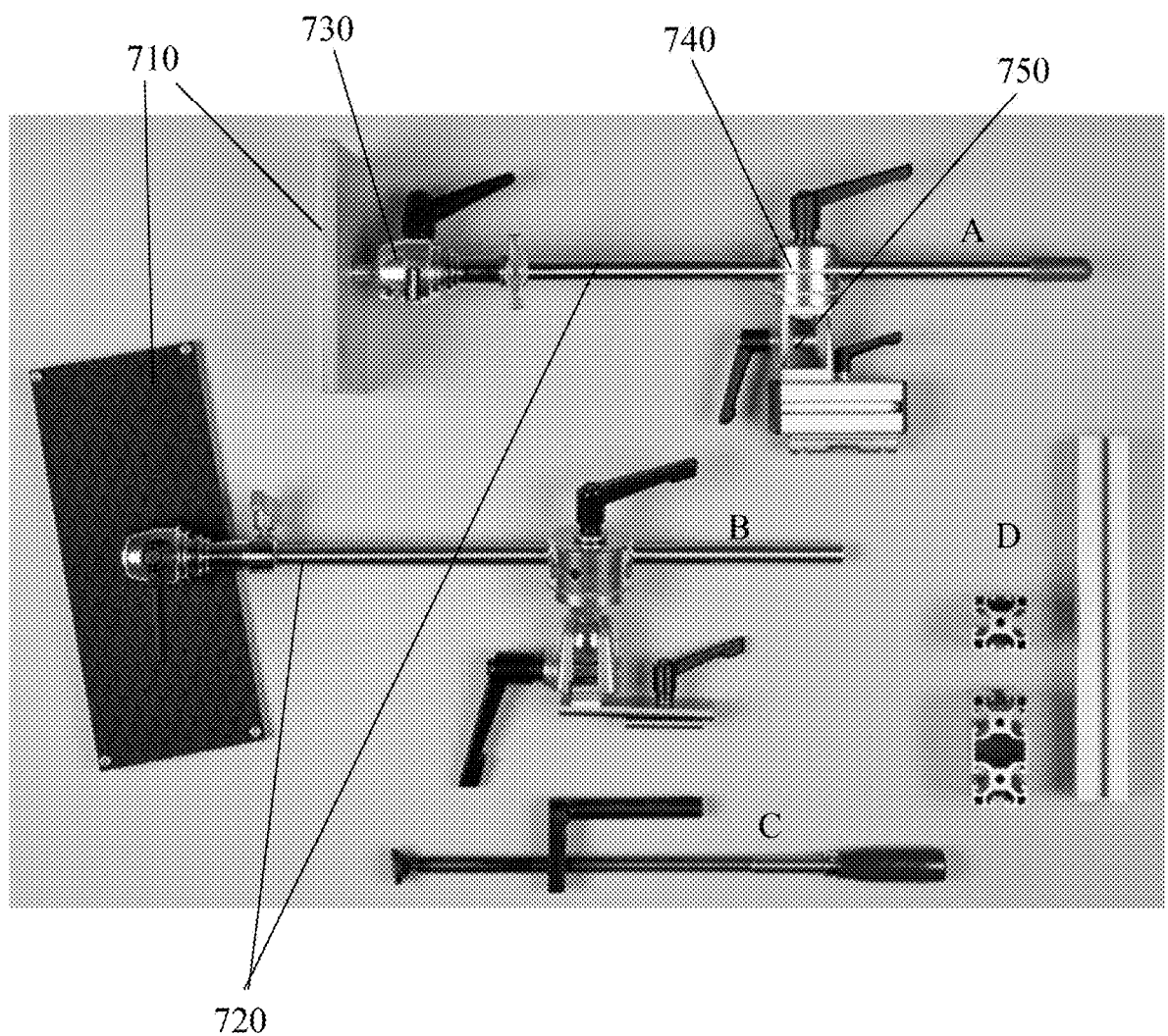
FIG. 11 is a photograph of a selection of articulated arms with rectangular backing surfaces mounted on steel tube.

Another type of frame is an adjustable aluminum framework with articulated arms for precise positioning of multiple backing surfaces, as shown in FIGS. 9-11. With this clamping device, a conservator can quickly install and position multiple backing surfaces in appropriate locations. The frame in FIG. 9 may be able to accommodate sculptures and other objects of varying sizes and shapes up to 220 cm in height and 110 cm in width. It should be recognized that frames and frame components of other sizes may be constructed for shimbari methods for larger objects. For example, the frames and components may be larger or smaller than the examples described herein.

The results from the rod pressure tests helped not only to establish the dimensions of the frame but also the space required to comfortably position the adjustable backing surfaces. Calculating the potential force of multiple shimbari rods was conducted to aid in the selection of the aluminum components and hardware.

A mobile base 606 was designed to support a platform 611 with a locking turntable 605 for the objects 604. An inverted timing belt mounted on a 59 cm disc below the turntable can be used for a lock, and the turntable can be adjusted in 1.8-degree increments for precise positioning of the object. A vertical frame 601 of structural components rises from the rear of the base 606 and extends on each side. The vertical frame 601 in FIG. 9 is 40 mm×80 mm, but other sizes may be used. Smaller frames components, e.g., arms 607, can be hinged on either end of the rear frame, creating a kind of adjustable proscenium around the object 604. In some examples, the smaller frame components can be 40 mm×40 mm. By changing the angle of the hinged frames, the conservator can control their distance from the object. As shown in FIG. 9, this arrangement can allow pressure to be exerted on one side of an object, with support on the opposite side, or pressure on both sides. The backing plate/counterforce element 610 can be clamped at varying angles to enable parallel force to be applied from the pressure rods 602 to the pressure pad 603 and object 604. It is also possible to open the two hinged frames/arms 607 so they are substantially parallel with the back frame 601 and, therefore, extending the back frame 601 to use the shimbari method for treating flat elements such as wall panels or mural paintings.

With backing plates 610 mounted to the entire frame, approximately 220 degrees of the circumference of an object (e.g., sculpture) 604 can be treated at one time while also providing ample working space for the conservator. In the frame of FIG. 9, up to 75 cm in diameter of the sculpture may be treated at one time. The locking turntable 605 can allow the conservator to reorient the object (sculpture) 604 within the frame as the work proceeds. The platform 611, with its locking turntable, can slide forward to accommodate larger objects and increase working space in the rear when required. The platform 611 may be wooden, polymeric, or other materials known to those skilled in the art. The platform in FIG. 9 can slide forward by 130 mm, but other sliding distances may be used.

Figure 12:
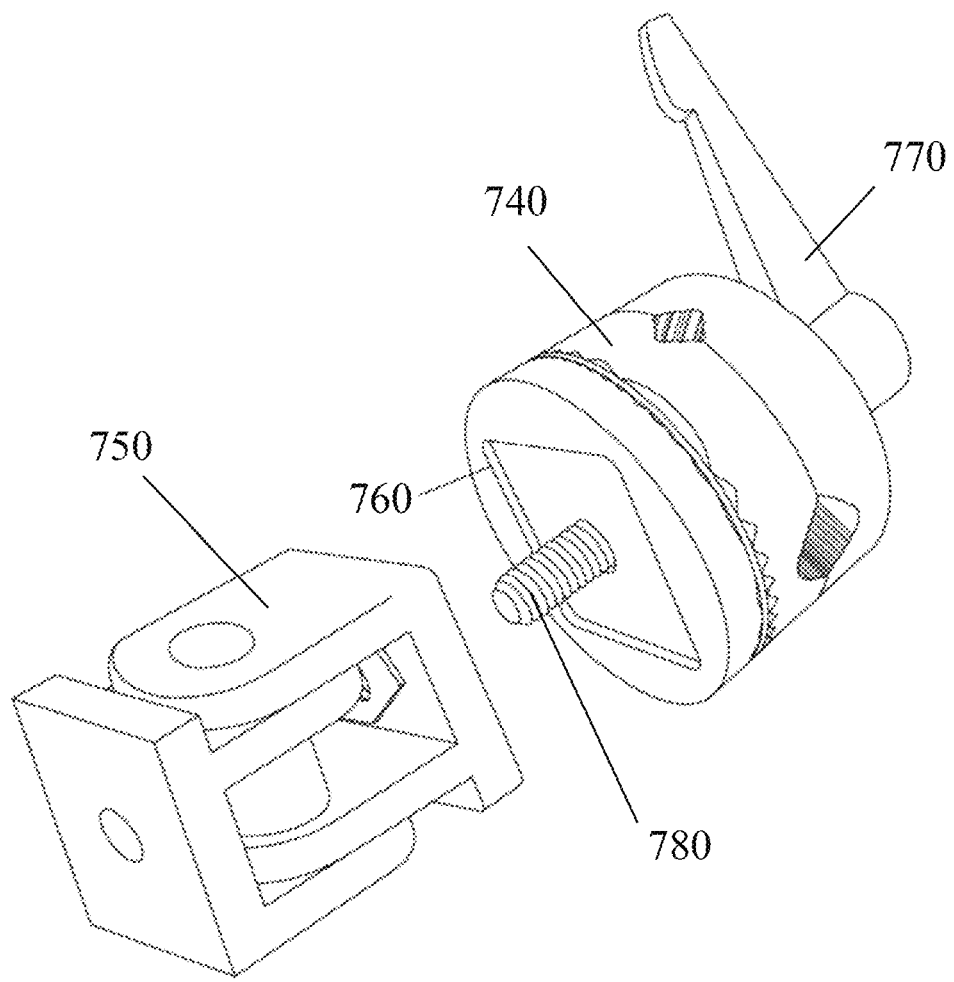
FIG. 12 is a drawing of an ITEM hinge and KUPO grip head assembled with an interlocking recess to transfer torque to the frame.
Figure 13:
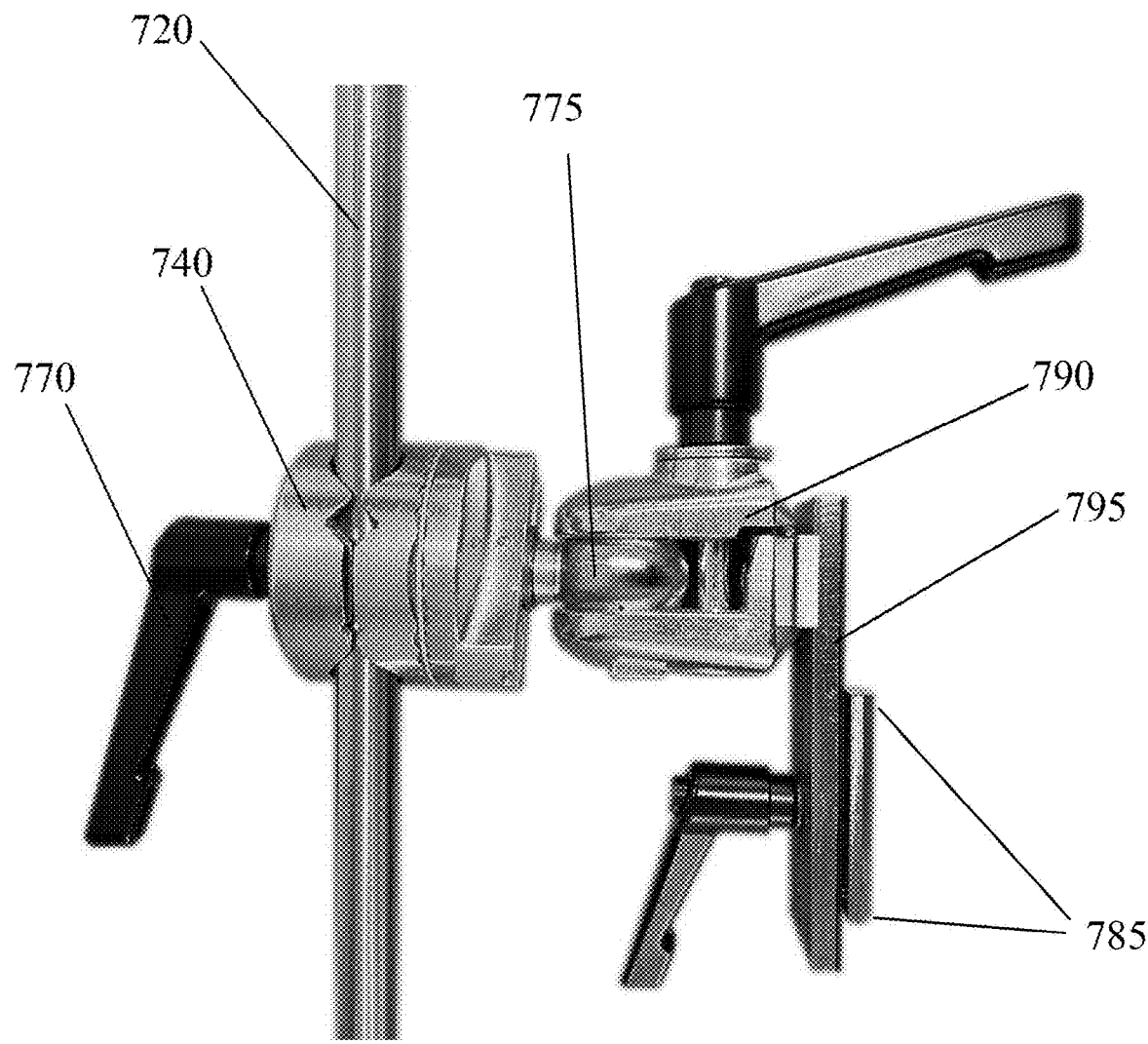
FIG. 13 is a photograph of a custom pivot mount with a ball joint.

An assortment of flat, rectangular backing surfaces (counterforce element) 710 and positioning hardware was made as shown in FIGS. 11-13. The backing surfaces/backing plates 710 can be made of 12 mm laminated Baltic birch and 4 mm strong and lightweight carbon fiber sheets. These backing plates 710 were all faced with perforated 3 mm acrylic to hold the shimbari rod ends securely. It should be recognized that other dimensions and materials known to those skilled in the art may be used for the backing plates. Each plate 710 can be mounted to a steel tube 720 by a pivot mount (locking swivel ball joint) 730 to allow for quick positioning parallel to an object's surface. In FIG. 11, the steel tube has a diameter of 16 mm. The steel tubes 720 may be held securely by a second pivot mount (head 740 and hinge 750). The KUPO grip heads 740 (KUPO CO. Ltd., San Chung, Taipei, Taiwan) can pivot on a horizontal axis. The KUPO grip heads were 2.5 inches (63 mm), but other sizes may be used. These can be mounted to a locking, ITEM hinge 750 pivoting on a vertical axis. The ITEM hinges were 40 mm, but other sizes may be used. In some examples, twelve or more locking, ITEM hinges 750 can be mounted to a frame. When positioning backing surfaces 710 for multiple shimbari rods, some consideration of moment forces may be appropriate. In some examples, the ITEM hinges 750 may be rated at 20 Nm when locked. This indicates an acceptable moment load of 6.7 kg directed 30 cm off-center from the hinge or a 3.34 kg load directed 60 cm off center. While the hinges may accommodate these off-center loads, the best approach, particularly when anticipating applying significant pressure, may be to position the object so that the hinge holding the backing surface is approximately perpendicular to the area of repair. The hinges can mount to any frame member on a locking, sliding block that allows for adjustment of location. The pivot mount hardware with locking swivel ball joint can have KUPO grip heads 740 on ITEM hinge 750 (A), and custom mount (B). The KUPO head 740 can have a machined recess area 760 with threaded connector 780 to engage the hinge 750 and receive the threaded connector 780. The custom mount for structural repairs can also be used in combination with other clamping hardware such as a threaded rod clamp (C) and include aluminum components (D). The KUPO head 740 can have an adjustable handle 770 that can be threaded to engage with the grip head. The ITEM hinge 750 can be 40 mm in size. The KUPO head 740 may be 2.5 inches. In some examples, the handle 770 may be 8 mm with a 1.25 thread, but other configurations can be used.

In addition, custom mounts that can be used with shimbari backing surfaces or other clamping hardware, such as a threaded rod clamp, can be added on the outermost faces of the swinging frames using stronger hardware to allow for structural repairs. At least four custom hardware mounts were developed for system described herein. This hardware can also use the KUPO grip head but include a stronger custom sliding mount and lock on the ITEM frame as required for the forces applied. For example, FIG. 13 shows custom mount B in greater detail. A ball joint 790 serves as a hinge allowing 180-degree rotation. The ball joint 790 may be similar to those used for holding heavy photography equipment. The ball joint 790 is inset into a steel plate 795 which can slide in the frame's extrusion (aluminum components) and hold a pivot mount KUPO grip head 740 with increased rigidity. The ball 775 serves as a hinge allowing 180-degree rotation. Pins 785 prevent rotation of the plate 795 on the frame. The pins may be made from steel or other suitable material.

The terms "a", "an", and "the" refer to "one or more" when used in this application, including the claims. Thus, for example, reference to "an arm" includes a plurality of such arms, unless the context clearly is to the contrary (e.g., a plurality of arms), and so forth.

Various embodiments of the disclosure have been described herein. It should be recognized that these embodiments are merely illustrative of the present disclosure. Variations of those preferred embodiments may become apparent to those of ordinary skill in the art upon reading the foregoing description. It is expected that skilled artisans can employ such variations as appropriate, and the disclosure is intended to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated or otherwise clearly contradicted by context.

Illustrative Embodiments of Suitable Methods and Devices

As used below, any reference to methods, devices, or kits is understood as a reference to each of those methods, devices, or kits disjunctively (e.g., "Illustrative embodiment 1-4 is understood as illustrative embodiment 1, 2, 3, or 4.").

Illustrative embodiment 1 is a system for applying pressure to an object comprising: a frame comprising a pivot mount connected to the frame, the pivot mount being configured to position a counterforce element; a pressure rod configured to apply pressure when compressed in a longitudinal direction, wherein the pressure rod comprises a first end and a second end, the first end being configured to contact the counterforce element; and a pressure pad configured to transfer pressure from the pressure rod to the object, wherein the pressure pad comprises a top face and a bottom face, the top face comprising a dimple configured to receive and secure the second end of the pressure rod in a compressed state.

Illustrative embodiment 2 is the system of any preceding or subsequent illustrative embodiment, wherein the counterforce element is positioned substantially parallel to a targeted pressure zone on a surface of the object.

Illustrative embodiment 3 is the system of any preceding or subsequent illustrative embodiment, wherein the counterforce element comprises a planar surface.

Illustrative embodiment 4 is the system of any preceding or subsequent illustrative embodiment, wherein the counterforce element is positioned to provide force in a substantially perpendicular alignment to a targeted pressure zone on a surface of the object.

Illustrative embodiment 5 is the system of any preceding or subsequent illustrative embodiment, wherein the counterforce element comprises a textured surface, fine grooves, or both to secure the first end of the pressure rod.

Illustrative embodiment 6 is the system of any preceding or subsequent illustrative embodiment, further comprising a barrier layer between the bottom face of the pressure pad and the object.

Illustrative embodiment 7 is the system of any preceding or subsequent illustrative embodiment, wherein the barrier layer comprises a polyester film (Mylar), a fluorinated ethylene propylene film, or a polyethylene film.

Illustrative embodiment 8 is the system of any preceding or subsequent illustrative embodiment, wherein the pressure pad comprises a urethane rubber.

Illustrative embodiment 9 is the system of any preceding or subsequent illustrative embodiment, wherein the pressure pad is substantially transparent.

Illustrative embodiment 10 is the system of any preceding or subsequent illustrative embodiment, wherein the pressure pad is free of silicone rubber.

Illustrative embodiment 11 is the system of any preceding or subsequent illustrative embodiment, wherein the pressure pad is non-marking to a surface of the object.

Illustrative embodiment 12 is the system of any preceding or subsequent illustrative embodiment, wherein the pressure pad has a hardness of from 25 to 100 Shore A.

Illustrative embodiment 13 is the system of any preceding or subsequent illustrative embodiment, wherein a point pressure for the pressure rod is from 40 g to 15000 g.

Illustrative embodiment 14 is the system of any preceding or subsequent illustrative embodiment, wherein a length of the pressure rod is from 150 mm to 1000 mm.

Illustrative embodiment 15 is the system of any preceding or subsequent illustrative embodiment, wherein a diameter of the pressure rod is from 1.5 mm to 6.5 mm.

Illustrative embodiment 16 is the system of any preceding or subsequent illustrative embodiment, wherein the pressure rod is compressed at a distance of from 0 mm to 150 mm.

Illustrative embodiment 17 is the system of any preceding or subsequent illustrative embodiment, wherein the pressure rod comprises fiberglass, wood, or bamboo.

Illustrative embodiment 18 is the system of any preceding or subsequent illustrative embodiment, wherein the pressure rod further comprises a polymer end cap over the first end, the second end, or both the first end and second end.

Illustrative embodiment 19 is the system of any preceding or subsequent illustrative embodiment, wherein the bottom face of the pressure pad comprises a dimple or a textured surface.

Illustrative embodiment 20 is the system of any preceding or subsequent illustrative embodiment, wherein the counterforce element comprises wood, (ash, birch), carbon fiber, acrylic, or combinations thereof.

Illustrative embodiment 21 is the system of any preceding or subsequent illustrative embodiment, wherein the frame further comprises a longitudinal slot configured to receive a stationary end of the pivot mount.

Illustrative embodiment 22 is the system of any preceding or subsequent illustrative embodiment, further comprising a track rail, a roller, a hinged articulating arm, a stationary arm, a threaded rod clamp, or combinations thereof.

Illustrative embodiment 23 is the system of any preceding or subsequent illustrative embodiment, wherein the counterforce element is connected to a lockable swivel ball joint connected to a rod or a tube.

Illustrative embodiment 24 is the system of any preceding or subsequent illustrative embodiment, wherein the rod or the tube is connected to a pivotal head connected to the pivot mount.

Illustrative embodiment 25 is the system of any preceding or subsequent illustrative embodiment, wherein the pivotal head pivots along a horizontal axis and the pivot mount pivots along a vertical axis.

Illustrative embodiment 26 is the system of any preceding or subsequent illustrative embodiment, wherein the pivot mount is connected to the frame by a sliding block.

Illustrative embodiment 27 is the system of any preceding or subsequent illustrative embodiment, wherein the system allows for 180 degree rotation of the counterforce element in relation to the frame.

Illustrative embodiment 28 is the system of any preceding or subsequent illustrative embodiment, further comprising a fill material to securely position the object.

Illustrative embodiment 29 is the system of any preceding or subsequent illustrative embodiment, wherein the fill material is a vacuum cushions filled with polystyrene spheres, an air cushion, or combinations thereof.

Illustrative embodiment 30 is the system of any preceding or subsequent illustrative embodiment, further comprising a mobile base connected to the frame.

Illustrative embodiment 31 is the system of any preceding or subsequent illustrative embodiment, further comprising a locking turntable.

Illustrative embodiment 32 is the system of any preceding or subsequent illustrative embodiment, wherein the locking turntable is configured to move in a lateral direction to expand a distance between the frame and the locking turntable.

Illustrative embodiment 33 is the system of any preceding or subsequent illustrative embodiment, wherein the system is modular, mobile, or both.

Illustrative embodiment 34 is the system of any preceding or subsequent illustrative embodiment, wherein a structural strength of the system is greater than potential compression forces exerted by multiple pressure rods.

Illustrative embodiment 35 is the system of any preceding illustrative embodiment, wherein the system is used for conservation of art.

Illustrative embodiment 36 is a method of applying pressure to an object for surface stabilization comprising: positioning an object in a shimbari frame comprising a pivot mount assembly connected to the frame; positioning a counterforce element with the pivot mount assembly such that the counterforce element positioned to provide force in a substantially perpendicular alignment to a targeted pressure zone on a surface of the object; positioning a pressure pad on the targeted pressure zone on the surface of the object, the pressure pad comprising a dimple on a top face of the pressure pad; and positioning a pressure rod between the pressure pad and the counterforce element, with a first end of the pressure rod contacting the counterforce element and a second end of the pressure rod positioned seated within the dimple of the pressure pad.

Illustrative embodiment 37 is the method of any preceding or subsequent illustrative embodiment, further comprising placing a barrier layer between a bottom face of the pressure pad and the object.

Illustrative embodiment 38 is the method of any preceding or subsequent illustrative embodiment, wherein the barrier layer comprises a polyester film (Mylar), a fluorinated ethylene propylene film, or a polyethylene film.

Illustrative embodiment 39 is the method of any preceding or subsequent illustrative embodiment, further comprising positioning a fill material under at least a portion of object to secure the object.

Illustrative embodiment 40 is the method of any preceding or subsequent illustrative embodiment, further comprising rotating the object into position using a locking turntable connected to the frame.

Illustrative embodiment 41 is the method of any preceding illustrative embodiment, wherein the object for surface restoration is a sculpture, a painting, or other work of art.

Illustrative embodiment 42 is a modular system for applying pressure to an object for conservation of art comprising: a frame comprising a hinged articulating arm; a pivot mount connected to the frame, the pivot mount being configured to position a counterforce element substantially parallel to a targeted pressure zone on a surface of the object, wherein the counterforce element comprises a textured surface or finely grooved surface and is connected to a lockable swivel ball joint connected to a rod or a tube that is connected to a pivotal head connected to the pivot mount; a fiberglass pressure rod configured to apply pressure when compressed in a longitudinal direction, wherein the pressure rod comprises a polymer end cap over each of a first end and a second end of the pressure rod, and wherein the first end of the pressure rod is configured to contact the counterforce element; a urethane rubber pressure pad configured to transfer pressure from the pressure rod to the object, wherein the pressure pad is substantially transparent and comprises a top face and a bottom face, the top face comprising a dimple configured to receive and secure the second end of the pressure rod in a compressed state; a barrier layer comprising a polyester film (Mylar), a fluorinated ethylene propylene film, or a polyethylene film between the bottom face of the pressure pad and the object; and a locking turntable connected to the frame, wherein the turntable rotates and locks in increments of less than 2 degrees.

REFERENCES

Bainbridge, T., S. Rivers, Y. Yamashita, A. Thackray, and N. Newman. 2015. Short communication: *Goberge, shimbari*, go-bars: The use of flexible sticks for clamping. *Journal of the American Institute for Conservation* 54(2): 65-73.

What is claimed:

1. A system for applying pressure to an object comprising:
a frame comprising (i) a plurality of members that connect to define the frame, wherein at least one of the members comprises a longitudinal slot that forms a track along the member, and (ii) a positionable component connected to a member of the frame, wherein a stationary end of the positionable component is located within the track, and wherein the positionable component comprises a pivot mount configured to position a counterforce element;
a pressure rod configured to apply pressure when compressed in a longitudinal direction, wherein the pressure rod comprises a first end and a second end, the first end being configured to contact the counterforce element; and
a pressure pad configured to transfer pressure from the pressure rod to the object, wherein the pressure pad comprises a top face and a bottom face, the top face comprising a dimple configured to receive and secure the second end of the pressure rod in a compressed state.

2. The system of claim 1, wherein the counterforce element comprises a planar surface and is positioned with the planar surface substantially parallel to a targeted pressure zone on a surface of the object.

3. The system of claim 1, wherein the counterforce element is positioned to provide force in a substantially perpendicular alignment to a targeted pressure zone on a surface of the object.

4. The system of claim 1, further comprising a barrier layer comprising a polyester film, a fluorinated ethylene propylene film, or a polyethylene film between the bottom face of the pressure pad and the object.

5. The system of claim 1, wherein the pressure pad comprises a urethane rubber and is substantially transparent.

6. The system of claim 1, wherein the pressure pad has a hardness of from 25 to 100 Shore A.

7. The system of claim 1, wherein a point pressure for the pressure rod is from 40 g to 15000 g.

8. The system of claim 1, wherein a length is from 150 mm to 1000 mm and a diameter of the pressure rod is from 1.5 mm to 6.5 mm.

9. The system of claim 1, wherein the pressure rod is compressed at a distance of from 0 mm to 150 mm.

10. The system of claim 1, wherein the pressure rod comprises fiberglass, wood, or bamboo, and further comprises a polymer end cap over the first end, the second end, or both the first end and second end of the pressure rod.

11. The system of claim 1, wherein the counterforce element comprises wood, carbon fiber, acrylic, or combinations thereof, and further comprises a textured surface, fine grooves, or both to secure the first end of the pressure rod.

12. The system of claim 1, wherein the positional component further comprises a hinged articulating arm, a stationary arm, a threaded rod clamp, a lockable swivel ball joint connected to a rod or a tube, a pivotal head connected to the pivot mount, a sliding block, or combinations thereof.

13. The system of claim 1, wherein the system allows for 180 degree rotation of the counterforce element in relation to the frame.

14. The system of claim 1, further comprising a locking turntable configured to move in a lateral direction to expand a distance between the frame and the locking turntable.

15. The system of claim 1, wherein the system is used for conservation of art.

16. A method of applying pressure to an object for surface stabilization comprising:
positioning an object in a shimbari frame, wherein the frame comprises a plurality of members that connect to define the frame and a pivot mount assembly, wherein at least one of the members comprises a longitudinal slot that forms a track along the member, and wherein the pivot mount assembly comprises a counterforce element;
positioning the pivot mount assembly within the longitudinal slot;
positioning the counterforce element with the pivot mount assembly such that the counterforce element is positioned to provide force in a substantially perpendicular alignment to a targeted pressure zone on a surface of the object;
positioning a pressure pad on the targeted pressure zone on the surface of the object, the pressure pad comprising a dimple on a top face of the pressure pad; and
positioning a pressure rod between the pressure pad and the counterforce element, with a first end of the pressure rod contacting the counterforce element and a second end of the pressure rod positioned seated within the dimple of the pressure pad.

17. The method of claim 16, further comprising placing a barrier layer comprising a polyester film, a fluorinated ethylene propylene film, or a polyethylene film between a bottom face of the pressure pad and the object.

18. The method of claim 16, further comprising rotating the object into position using a locking turntable connected to the frame.

19. The method of claim 16, wherein the object for surface restoration is a sculpture, a painting, or other work of art.

20. A modular system for applying pressure to an object for conservation of art comprising:
a frame comprising a hinged articulating arm;
a pivot mount connected to the frame, the pivot mount being configured to position a counterforce element substantially parallel to a targeted pressure zone on a surface of the object, wherein the counterforce element comprises a textured surface or finely grooved surface and is connected to a lockable swivel ball joint connected to a rod or a tube that is connected to a pivotal head connected to the pivot mount;
a fiberglass pressure rod configured to apply pressure when compressed in a longitudinal direction, wherein the pressure rod comprises a polymer end cap over each of a first end and a second end of the pressure rod, and wherein the first end of the pressure rod is configured to contact the counterforce element;
a urethane rubber pressure pad configured to transfer pressure from the pressure rod to the object, wherein the pressure pad is substantially transparent and comprises a top face and a bottom face, the top face comprising a dimple configured to receive and secure the second end of the pressure rod in a compressed state;
a barrier layer comprising a polyester film, a fluorinated ethylene propylene film, or a polyethylene film between the bottom face of the pressure pad and the object; and
a locking turntable connected to the frame, wherein the turntable rotates and locks in increments of less than 2 degrees.

* * * * *